United States Patent
Curry et al.

(10) Patent No.: US 6,359,880 B1
(45) Date of Patent: Mar. 19, 2002

(54) PUBLIC WIRELESS/CORDLESS INTERNET GATEWAY

(76) Inventors: James E. Curry, 2019 Maleady Dr., Herndon, VA (US) 22070; Robert D. Farris, 114 Gold Thorn Way, Sterling, VA (US) 20164

( * ) Notice: Subject to any disclaimer, the term of this patent is extended or adjusted under 35 U.S.C. 154(b) by 0 days.

(21) Appl. No.: 09/363,750

(22) Filed: Jul. 30, 1999

Related U.S. Application Data

(62) Division of application No. 08/815,291, filed on Mar. 11, 1997.

(51) Int. Cl.$^7$ ............................................... H04L 12/66
(52) U.S. Cl. ...................... 370/352; 370/328; 455/433; 455/435
(58) Field of Search ................................. 370/351–356, 370/400–402, 310, 328, 338, 349, 389; 455/432–435

(56) References Cited

U.S. PATENT DOCUMENTS

| | | |
|---|---|---|
| 4,672,658 A | 6/1987 | Kavehrad et al. |
| 4,768,219 A | 8/1988 | Yamagata et al. |
| 4,852,148 A | 7/1989 | Shibata et al. |
| 4,875,231 A | 10/1989 | Hara et al. |
| 4,878,238 A | 10/1989 | Rash et al. |

(List continued on next page.)

OTHER PUBLICATIONS

"The Building of Intelligent Networks: Architecture and systems for Alcatel", Dunogue et al., Alcatel CIT commutation & transmission No. 2, SOTELEC, 1989, pp. 5–22.
"Freebie Heebie–Jeebies: New Long–Distance Calling Via the Internet Scares Small Phone Firms", Mills, Mike, The Washington Post, Mar. 8, 1996, p. F1.
"Internet phone wars heating up: Companies improve and encourage users to test products", Hughes, David T., The Journal Fairfax, Virginia, Jan. 2, 1996, p. A6.
"What hath (net) god wrought", Hughes, David T., The Journal, Fairfax, Virginia, Feb. 21, 1995, pp. B1 and B2.

(List continued on next page.)

*Primary Examiner*—Wellington Chin
*Assistant Examiner*—Steven Nguyen

(57) ABSTRACT

A localized wireless gateway system provides wireless telephone communication, and for at least interexchange communication, provides voice telephone access to a public packet data network, such as the Internet. The wireless gateway system includes base station transceivers and a packet service gateway coupling the transceivers to the public packet data network. The packet service gateway compresses and decompresses voice frequency communication signals, and it sends and receives the compressed signals in packet form via the network. The packet service gateway also provides for signaling through the network to establish two-way voice communication sessions. In the preferred implementation, the localized wireless gateway system includes at least one radio port control unit coupled to the base station transceivers for controlling calls through the transceivers. The localized wireless gateway system also includes a telephone switch, such as a digital PBX, selectively providing telephone communication channels between the radio port control unit(s) and the packet service gateway. An access manager controls registration and validation of roaming wireless telephones to utilize the wireless gateway system. The access manager also transmits location information for registered wireless telephones to a home location register database via the network. The communications of the access manager to the home location register database permit telephone authentication as well as maintenance of accurate location information in the home location register identifying the current gateway through which a caller can reach the roaming user's wireless telephone.

14 Claims, 6 Drawing Sheets

U.S. PATENT DOCUMENTS

| | | | |
|---|---|---|---|
| 4,916,691 A | | 4/1990 | Goodman |
| 4,965,849 A | | 10/1990 | Kunihiro |
| 4,969,205 A | | 11/1990 | Itoh |
| 4,980,907 A | | 12/1990 | Raith et al. |
| 4,989,230 A | | 1/1991 | Gillig et al. |
| 5,014,295 A | | 5/1991 | Kunihiro |
| 5,020,094 A | | 5/1991 | Rash et al. |
| 5,040,177 A | | 8/1991 | Martin et al. |
| 5,044,010 A | | 8/1991 | Frenkiel |
| 5,127,042 A | | 6/1992 | Gillig et al. |
| 5,155,689 A | | 10/1992 | Wortham |
| 5,157,709 A | | 10/1992 | Ohteru |
| 5,157,710 A | | 10/1992 | Itoh |
| 5,159,592 A | | 10/1992 | Perkins |
| 5,181,200 A | | 1/1993 | Harrison |
| 5,410,543 A | | 4/1995 | Seitz et al. |
| 5,442,633 A | | 8/1995 | Perkins et al. |
| 5,475,689 A | | 12/1995 | Kay et al. |
| 5,590,133 A | * | 12/1996 | Billstrom et al. ............ 370/349 |
| 5,596,573 A | * | 1/1997 | Bertland ...................... 370/474 |
| 5,604,737 A | | 2/1997 | Iwami et al. |
| 5,608,786 A | | 3/1997 | Gordon |
| 5,661,790 A | | 8/1997 | Hsu |
| 5,724,355 A | | 3/1998 | Bruno et al. |
| 5,726,984 A | | 3/1998 | Kubler et al. |
| 5,729,536 A | | 3/1998 | Doshi et al. |
| 5,793,762 A | * | 8/1998 | Penners et al. ............. 370/389 |
| 5,819,178 A | * | 10/1998 | Cropper ...................... 455/433 |
| 5,838,682 A | | 11/1998 | Dekelbaum et al. |
| 5,850,433 A | | 12/1998 | Rondeau |
| 5,867,495 A | | 2/1999 | Elliott et al. |
| 5,883,891 A | | 3/1999 | Williams et al. |
| 5,889,774 A | | 3/1999 | Mirashrafi et al. |
| 5,901,352 A | | 5/1999 | St-Pierre et al. |
| 5,910,946 A | * | 6/1999 | Csapo ......................... 370/328 |
| 5,923,659 A | | 7/1999 | Curry et al. |
| 5,953,322 A | * | 9/1999 | Kimball ...................... 370/328 |
| 6,118,778 A | * | 9/2000 | Amin .......................... 370/352 |

OTHER PUBLICATIONS

"WebPhone heading for serious telephony", Hughes, David T., The Journal, Fairfax, Virginia, May 28, 1996, p. A8.

"It's the Net's Best Thing to Being There: With Right Software, Computer Becomes a Toll–Free Telephone", Mills, Mike, The Washington Post, Jan. 23, 1996, pp. C1 and C5.

"Computer Telephony Over the Internet", Grigonis, Richard, CT and the Net, Mar. 1996.

"Greek of the Week", Karn, Phil et al., Internet Talk Radio, Mobil IP Networking, Nov. 1993.

"How to Build an Internet PBX", McConnell, Brian, http://www.phonezone.com/ip–phone.htm, pp. 1–9.

"Welcome to the Phone Zone", Pacific Telephony Design, http://www.phonezone.com/index2.htm, pp. 1–6.

"Computer Telephony and the Internet", Stylus Innovation, http://www.stylus.com/hvml.htm, pp. 1–9.

"Innovations in Internet Telephony: The Internet as the Competitor to the POTS Network", Sears, Andrew, Innovations in Internet Telephony: The Internet as the Successor to the POTS Network, Feb. 28, 1996, pp. 1–6.

* cited by examiner

PUBLIC WIRELESS/CORDLESS INTERNET GATEWAY

This application is a divisional of application Ser. No. 08/815,291 filed Mar. 11,1997.

TECHNICAL FIELD

The present invention relates to a localized installation of a gateway system, for private or limited public wireless telephone communication, with at least the interexchange portion of telephone calls via the localized wireless gateway system utilizing a public packet switched data network such as the Internet.

BACKGROUND ART

In our increasingly mobile society, there has been an ever increasing demand for mobile communications to allow a person to roam freely while making and receiving telephone calls from virtually any location. A wide range of wireless systems are in use today and more are now scheduled for near term future deployment, including cellular telephone systems (both analog and digital) and lower power portable handset type systems now commonly referred to as personal communications service (PCS) systems.

Public cellular telephone systems and the emerging low-power, digital cellular PCS systems provide a high degree of mobile communications, as subscribers roam over large geographic areas. However, such systems are expensive to deploy, and as a result, air time charges for use of such systems are high. A number of applications have been recognized where wireless communications are desirable, but implementation of a full public cellular telephone system is unnecessary. This specification refers to these more limited systems as 'localized' wireless or cordless telephone type communications systems.

For example, U.S. Pat. No. 4,980,907 to Raith et al. discloses a wireless communication system with roaming capabilities. Each portable radio terminal can operate at a subscriber's residence as part of residential equipment, or in a commercial subscriber's business area as an extension to a PABX. When away from the normal residential or business location, however, the portable radio terminal can operate through public transceivers referred to as telepoint terminals. Each residential installation, PABX and telephone terminal connects through a telephone line or trunk to an exchange of a public switched telecommunication network (PSTN).

U.S. Pat. No. 4,875,231 to Hara et al. discloses a radio telephone system, which includes a base station connected to a telephone exchange and a plurality of mobile stations. The mobile stations communicate with the base station through a control channel and a number of communication channels.

Each of U.S. Pat. Nos. 4,965,849 and 5,014,295 to Kunihiro discloses a cordless telephone system, wherein the master station connects to two outgoing telephone lines. The master station includes a number of base transceiver units for simultaneously communicating with a number of portable wireless handsets.

U.S. Pat. Nos. 4,878,238 and 5,020,094 to Rash et al. describe a cordless telephone network which allows each hand-held cordless telephone unit to be used with any of a number of strategically located base units, for example located at truck stops, rest areas along interstate highways, convention centers and the like. A base unit connects via a telephone line to a conventional commercial telephone network. The base unit includes an FM transmitter, FM receiver, CPU and a telephone line interface circuit. The Rash et al. Patents mention that it would be possible to have multiple base units at one location, each one being attached to a different land line and each one operating on a cordless telephone channel.

As shown by the above description, the cordless telephone systems utilized in the prior art have all relied on an existing public telephone network to transport communications outside of the cordless telephone systems themselves. In such a situation, for example, a long distance call typically would go through a local exchange carrier to the point of presence of an interexchange carrier for routing to the area of the called party. Although fees and billing arrangements vary widely, each carrier imposes some form of charge for its handling of a portion of such a call. The long distance and international charges by the interexchange carriers, in particular, can be quite high.

Concurrent with developments in wireless communications, outlined above, attention recently has been directed to implementing a variety of communication services, including voice telephone service, over the world-wide packet switched data network now commonly known as the Internet. The Internet had its genesis in U.S. Government programs funded by the Advanced Research Projects Agency (ARPA). That research made possible national internetworked data communication systems. This work resulted in the development of network standards as well as a set of conventions, known as protocols, for interconnecting data networks and routing information across the networks. These protocols are commonly referred to as TCP/IP. The TCP/IP protocols were originally developed for use only through ARPANET but have subsequently become widely used in the industry. TCP/IP is flexible and robust. TCP takes care of the integrity, and IP moves the data.

Internet provides two broad types of services: connectionless packet delivery service and reliable stream transport service. The Internet basically comprises several large computer networks joined together over high-speed data links ranging from ISDN to T1, T3, FDDI, SONET, SMDS, ATM, OT1, etc. The most prominent of these national nets are MILNET (Military Network), NSFNET (National Science Foundation NETwork), and CREN (Corporation for Research and Educational Networking). In 1995, the Government Accounting Office (GAO) reported that the Internet linked 59,000 networks, 2.2 million computers and 15 million users in 92 countries. However, since then it is estimated that the number of Internet users continues to double approximately annually.

In simplified fashion the Internet may be viewed as a series of packet data switches or 'routers' connected together with computers connected to the routers. The Information Providers (IPs) constitute the end systems which collect and market the information through their own servers. Access providers are companies such as UUNET, PSI, MCI and SPRINT which transport the information. Such companies market the usage of their networks to the actual end users.

FIG. 5 shows a simplified diagram of the Internet and various types of systems typically connected thereto. Generally speaking the Internet consists of Autonomous Systems (AS) type packet data networks which may be owned and operated by Internet Service Providers (ISPs) such as PSI, UUNET, MCI, SPRINT, etc. Three such AS/ISPs appear in FIG. 5 at 310, 312 and 314. The Autonomous Systems (ASs) are linked by Inter-AS Connections 311, 313 and 315.

Information Providers (IPs) 316 and 318, such as America Online (AOL) and Compuserve, connect to the Internet via high speed lines 320 and 322, such as T1/T3 and the like. Information Providers generally do not have their own Internet based Autonomous Systems but have or use Dial-Up Networks such as SprintNet (X.25), DATAPAC and TYMNET.

By way of current illustration, MCI is both an ISP and an IP, SPRINT is an ISP, and the MicroSoft Network (MSN) is an IP using UUNET as its ISP. Other information providers, such as universities, are indicated in exemplary fashion at 324 and are connected to the AS/ISPs via the same type connections here illustrated as T1 is lines 326. Corporate Local Area Networks (LANS), such as those illustrated in 328 and 330, are connected through routers 332 and 334 and high speed data links such as T1 lines 336 and 338. Laptop computers 340 and 342 are representative of computers connected to the Internet via the public switched telephone network (PSTN) and are shown connected to the AS/ISPs via dial up links 344 and 346.

Recently, several companies have developed software for use on personal computers to permit two-way transfer of real-time voice information via an Internet data link between two personal computers, for example between PCs 340 and 342. In one of the directions, the sending computer converts voice signals from analog to digital format. The software facilitates data compression down to a rate compatible with modem communication via a POTS telephone line, in some cases as low as 2.4 kbits/s. The software also facilitates encapsulation of the digitized and compressed voice data into the TCP/IP protocol, with appropriate addressing to permit communication via the Internet. At the receiving end, the computer and software reverse the process to recover the analog voice information for presentation to the other party. These programs permit telephone-like communication between Internet users.

PCs having voice communication capabilities can conduct two-way, real-time audio communications with each other, in a manner directly analogous to a two-way telephone conversation. However, the actual signals exchanged between two such terminal devices go through the public packet data network. Typically, such communications at least bypass long distance interexchange carriers.

Internet based telephone programs have relied on servers (not separately shown) coupled to the Internet to establish voice communication links through the networks. Each person active on the network, who is willing to accept a voice call, must register with a server. A calling party can call only those persons registered on the voice communication server.

The development of the Internet, particularly voice telephone communication over the Internet, has been separate from efforts to develop and deploy localized wireless or cordless telephone type communications systems. For example, the PCs and server systems on the market today apparently have not permitted calling through the Internet to wireless telephone subscribers, particularly when roaming. As a result, a need still exists to find an effective cheaper alternative to the transport of calls to and from wireless systems via telephone carrier networks. More specifically, a need exists to provide a localized wireless or cordless telephone type communications system which can at least selectively provide voice traffic transport over a public packet switched data network, such as the Internet. A need further exists for systems and call processing methodologies to facilitate easy calling and efficient routing of calls to and from such a system, via the public packet data network.

DISCLOSURE OF THE INVENTION

The present invention meets the above stated needs by providing a localized wireless gateway offering cordless telephone service, including voice communication service, via a public packet network such as the Internet.

Thus, in one aspect, the present invention relates to a localized wireless gateway system. The inventive system includes a plurality of base station transceivers and a packet service gateway. The transceivers provide two-way wireless voice frequency communications for wireless terminals. The packet service gateway selectively couples the base station transceivers to the public packet data network. The gateway compresses and decompresses voice frequency communication signals and sends and receives the compressed signals in packet form via the network. The gateway also provides for signaling through the network to establish two-way voice communication sessions through the network.

In the presently preferred implementation, the localized wireless gateway system includes at least one radio port control unit coupled to the base station transceivers. Each radio port control unit controls wireless calls through one or more of the transceivers. The localized wireless gateway system also includes a telephone switch, such as a digital PBX, selectively providing telephone communication channels between the radio port control unit(s) and the packet service gateway. The packet service gateway may include a processing unit, line cards providing interfaces for the processing unit to the telephone switch and an interface card for providing communications through the public packet data network.

The preferred implementation of the localized wireless gateway system also includes an access manager.

The access manager controls registration and validation of roaming wireless terminal devices to utilize the wireless gateway system. The access manager also transmits location information for registered terminals to a home location register database via the public packet data network.

The communications of the access manager to the home location register database actually serve two functions. One is the validation of wireless terminals used by roaming subscribers, the other is the maintenance of accurate location information in the home location register identifying the current gateway through which a is caller can reach the roaming user,s wireless terminal. Other aspects of the invention therefore relate to methods of verifying terminal authorization and providing location information to the home location register, via communication through the public packet data network.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
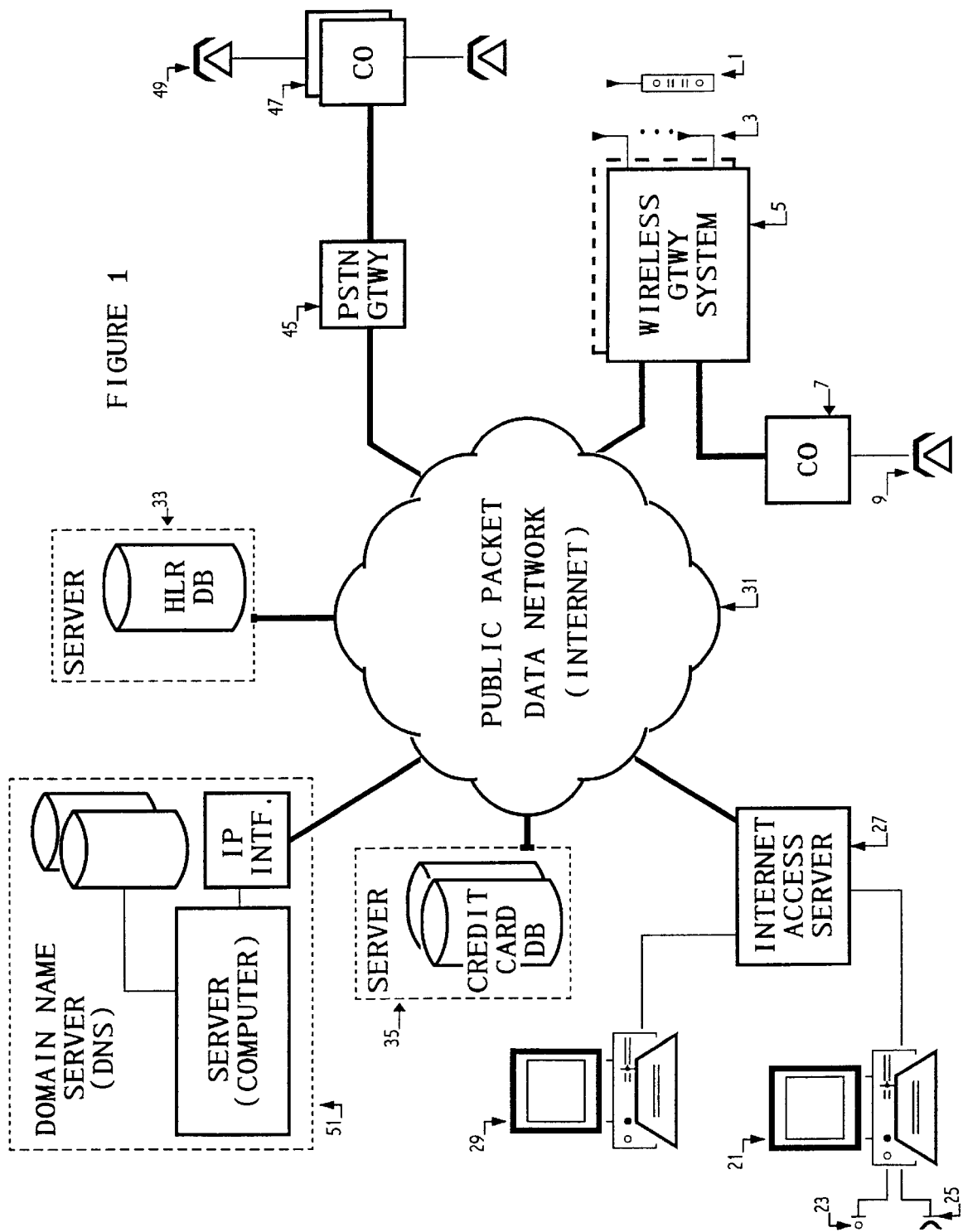
FIG. 1 is a high level block diagram showing the relationship of a wireless gateway system in accord with the invention to other communication network elements.

With reference to FIG. 1, the present invention provides a localized wireless gateway system 5 enabling wireless communication through antennas 3 with cordless or wireless telephone terminals shown as handsets 1. As used herein, 'voice' communication is essentially synonymous with 'audio' communication. The wireless handsets provide two-way communications to the wireless gateway system 5 of audio frequency information signals, typically voice signals. The wireless gateway system at least provides two-way voice communication from a wireless handset 1 via a public packet data network 31. The communication via the network 31 may go to voice telephone capable terminal devices, such as personal computers (PCs) 21, or through an appropriate PSTN gateway 45 to telephones 49 coupled to central offices 47 of a distant public switched telephone network. Preferably, the gateway system 5 also provides communication between two or more of the wireless handsets 1 as well as between any of the handsets 1 and local landline telephones 9 via one or more local central offices 7.

The gateway system 5 is a localized private system, as opposed to the common, public cellular telephone networks. The gateway system, for example, may provide communication within an office or industrial complex. Alternatively, a service provider may operate the gateway system 5 in a geographically limited public area of interest, such as an airport, shopping center, hotel/convention center complex or the like.

Each user will have a wireless telephone terminal device, preferably a wireless telephone handset 1. The wireless handset 1 is similar to a portable cellular telephone but operates at lower power levels and generally will be less expensive to own and operate. Because of its low power operation, the portable handset 1 has a longer period of operation between recharging of the battery, but the working range of the portable handset from an antenna cite is relatively short. Analog implementations of the handsets are contemplated, although digital implementations are preferred.

Figure 2:
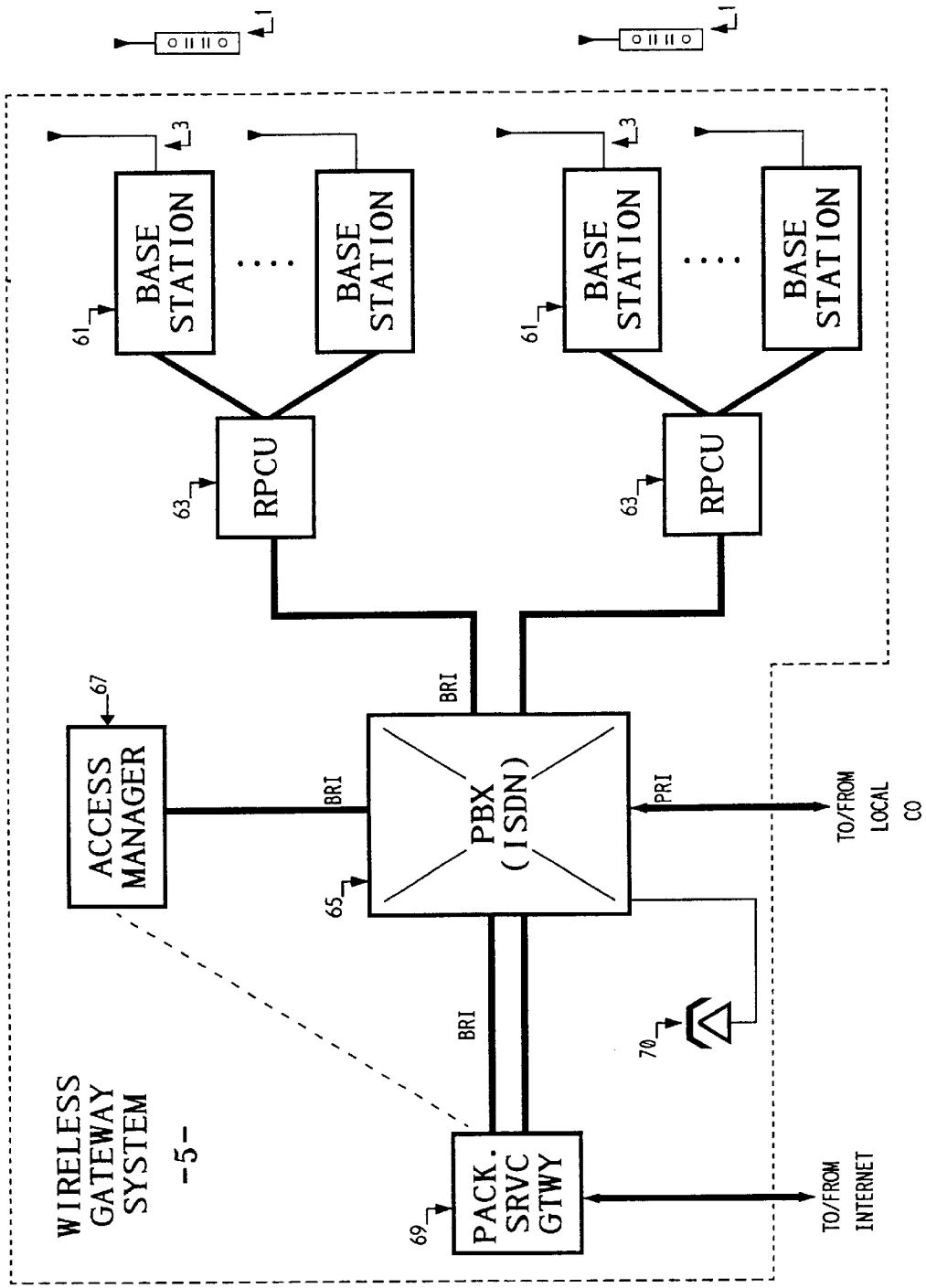
FIG. 2 is a functional block diagram of a preferred embodiment of the inventive wireless gateway system.

As discussed in more detail with regard to FIG. 2, the wireless gateway system 5 includes a packet service gateway as well as transceivers or base stations coupled to the antennas 3 to provide a number of wireless access points. The wireless access point equipment provides two-way wireless telephone communication with the handsets 1. The associated packet service gateway establishes two-way voice communication via the public packet switched data network 31, for each voice call in progress through a transceiver and a wireless telephone terminal 1. The packet service gateway performs the necessary compression and decompression of the voice signals and conversions between the protocols used for wireless voice communication and the TCP/IP protocols on the network 31. The wireless gateway system 5 also includes an access manager for controlling registration and billing related functions.

Figure 5:
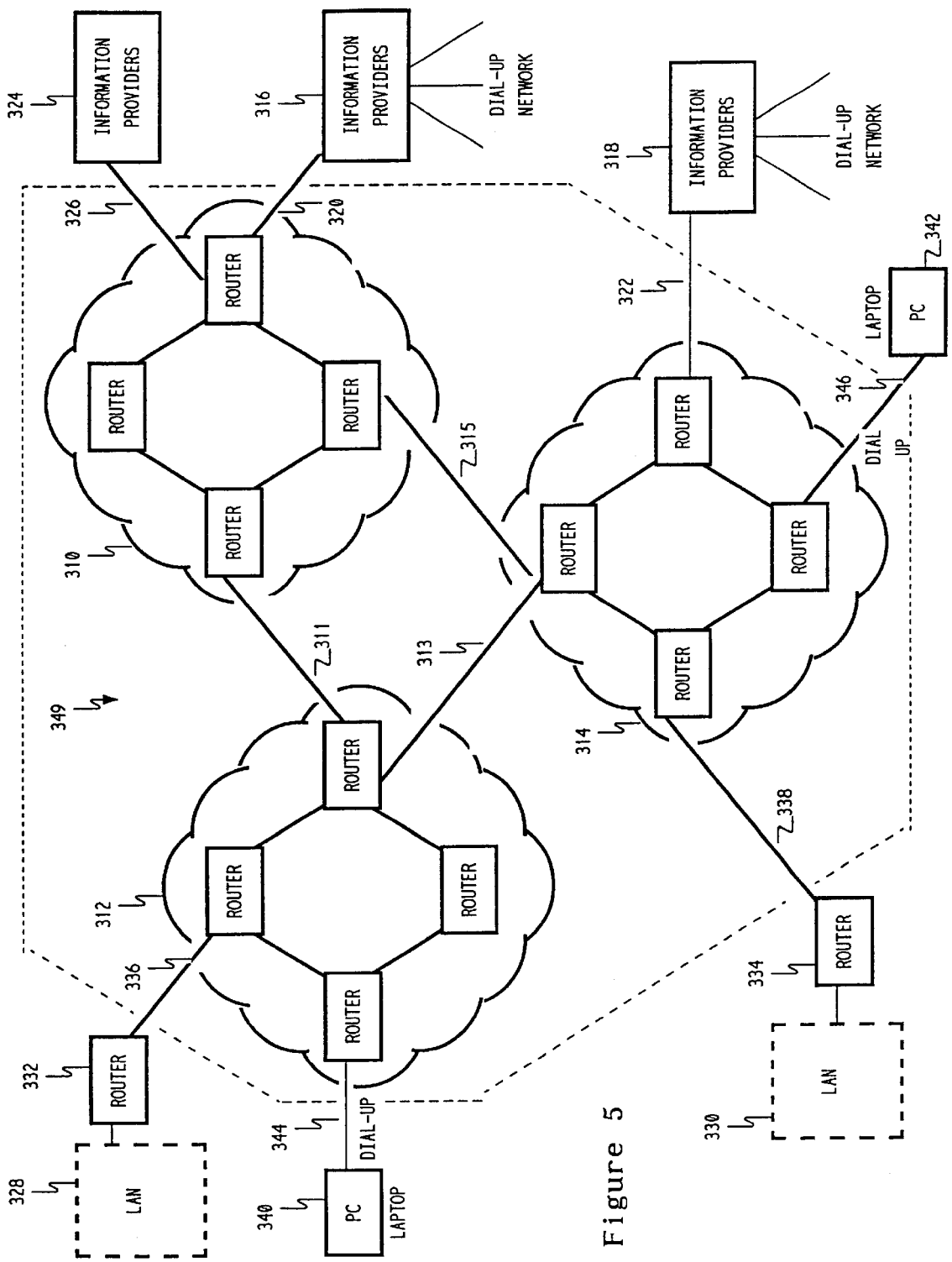
FIG. 5 is a block diagram of the public packet switched data network now commonly referred to as the Internet.

FIG. 1 depicts the public packet data network 31 as a cloud. In the preferred embodiment, the public packet data network 31 is a wide area data network formed of a number of interlinked networks, such as the international network now commonly referred to as the 'Internet'. More specifically, the network 31 comprises a network of interconnected routers and networks, such as shown in FIG. 5 and discussed above. The network utilizes Internet Protocol (IP) based packet switching to route data packets between source and destination nodes coupled to the network. A variety of computers and servers (not shown in FIG. 1 for simplicity) connect to the network 31, for example for providing web site services. Terminal devices communicate with the computers and servers as well as with each other. For simplicity, FIG. 1 shows two personal computer (PC) type terminal devices 21 and 29.

Typically, each of the PCs connect to the network 31 through an Internet access server, such as server 27 shown in FIG. 1. The server 27 aggregates traffic to and from the associated terminal devices for transport over a relatively high-speed link to the packet switched data network 31. The Internet access server 27 provides a compatible interface to the respective PCs (modem, ISDN or LAN) and protocol conversion and interfacing, as necessary, for two-way data communication over the particular high speed link to the packet data Internet.

For example, the server 27 may comprise a modem bank coupled to the public switched telephone network (not shown) and coupled through a high speed link to an IP router within the network 31. In such an implementation, the PCs 21 and 29 would have analog modems for dial-up communications with the server 27. For communications with the PCs 21, 29, the access server 27 would provide a point to point protocol (PPP) appearance.

As another example, the Internet access server 27 might communicate over a 10baseT Ethernet LAN with the PCs 21 and 29. In this example, the PCs 21, 29 would include Ethernet LAN type interface cards and would connect through appropriate wiring to the Internet access server 27. The server 27 would provide two-way protocol conversions, as necessary for IP communications over the network 31 and would connect via a high speed link to an IP router within the network 31. In such an implementation, the server 27 might also provide firewall functions, to control outside e access to the LAN and to control access from the PCs 21, 29 on the LAN to the public network 31.

The various PCs include processors, memories, various disc drives, etc. Each of the PCs also includes a display or monitor, a keyboard, and possibly one or more additional user input devices (not shown) such as a mouse, joystick or track ball. Typically, the software running on the PCs includes an operating system, such as Windows '95, and a series of compatible applications programs running under the operating system. The software preferably implements a graphical user interface, including a user interface for communications through the public packet data network 31.

Many of the PCs also have voice communication capabilities. For example, PC 21 includes a microphone 23 and one or more speakers 2S. These PCs also include analog to digital and digital to analog converters, and the CPUs in such PCs run software for compression and decompression of digitized audio (typically voice) information. The software also processes the audio information for transmission and reception of the compressed digital information in IP packets and using the appropriate protocol, for communication with the respective access server.

PCs having voice communication capabilities can conduct two-way, real-time audio communications with each other, in a manner directly analogous to a two-way telephone conversation. However, the actual signals exchanged between two such terminal devices go through the public packet data network 31 and the appropriate access servers 27. Typically, such communications at least bypass long distance interexchange carriers. If both PCs connect to the Internet via a LAN or other data network, the audio communications may not utilize the telephone network at all.

In accord with one feature of the invention, those PCs which have voice communication capabilities may also send and receive telephone calls via the wireless gateway system 5 with wireless handsets 1. Services between the PCs and the wireless handsets are discussed in more detail later.

The public packet data network 31 also connects to a number of PSTN gateways in different service areas, although only one such gateway 45 appears in FIG. 1. Each PSTN gateway 45 connects to one or more central offices 47 of the public switched telephone network in the. region where the gateway 45 is located. Calls through the network to and from such gateways typically bypass long distance interexchange carriers and may utilize a data network connection to a PC at one end of the call, as in the earlier example. The PCs having voice communication capabilities may send and receive telephone calls via the public switched telephone network 31 and one of the gateways 45 to persons using standard telephones 49. Similarly, persons using the handsets 1 may call or receive calls from persons using standard telephones 49 via the public packet data network 31 and one of the gateways 45. The PSTN gateway(s) 45 also permit calls between wireless handsets 1 and telephone station(s) 49 through the public packet data network 31.

Each PSTN gateway 45 provides a voice telephone grade interface to the public packet data network 31, for a large number of calls, between telephone networks such as the PSTN and/or cellular or PCS type public mobile telephone networks. Such a gateway 45 will connect to at least one central office (CO) 47 of the PSTN. The gateway connection typically utilizes one or more primary rate interface (PRI) type integrated services digital network (ISDN) line groups or a combination of one or more T1 circuits and a Simplified Message Desk Interface (SMDI) type signaling circuit. The line circuits provide digital line interconnections of the gateway 45 to the central office 47. The D channel of the PRI or the SMDI link carries a variety signaling back and forth between the PSTN gateway 45 and the CO 47. For example, on an incoming call from the CO 47 to the gateway 45, the signaling includes the calling party number and preferably the dialed destination digits.

The PSTN gateway 45 includes one or more computers for processing individual calls. The computers include appropriate line interfaces for answering incoming calls and initiating outgoing calls over the particular type of line circuits. The interfaces also receive and decode standard signaling messages from the PSTN, e.g. DTMF dialing signals and/or D channel ISDN signaling. The interfaces also detect line status and call progress signals on incoming and outgoing calls, either as in-band tone signals or as D channel messages. Each of the computers in the gateway 45 runs software to compress incoming audio signals from the PSTN in a standardized format and decompress digital audio signals in that format received via the public packet data network 31, for transmission over the PSTN. The computer (s) also perform the two-way protocol processing to send and receive compressed, digitized voice data in TCP/IP packet form over the network 31. The PSTN gateway 45 includes or connects to a router coupled to the public packet data network 31. Copending commonly assigned application Ser. No. 08/634,543 filed Apr. 18, 1996 describes several implementations of 'Internet Modules' which may serve as alternate embodiments of the PSTN gateway 45.

Communications via the public packet data network 31, such as the Internet, utilize IP protocol addressing. Each such address comprises a series of four numbers separated by dots. An example of an IP address would be 164.109.211.237. Each machine on the Internet has a unique number permanently or temporarily assigned to it which constitutes one of these four numbers. In the IP address, the leftmost number has the greatest weight. By analogy this would correspond to the ZIP code in a mailing address. At times the first two numbers constitute this portion of the address indicating a network or a locale. That network is connected to the last router in the transport path. In differentiating between two computers in the same destination network only the last number field changes. In such an example the next number field 211 identifies the destination router.

When a packet bearing a destination address leaves a source router, the router examines the first two numbers in a matrix table to determine how many hops are the minimum to get to the destination. It then sends the packet to the next router as determined from that table, and the procedure is repeated. Each router has a database table that finds the information automatically. This continues until the packet arrives at the destination computer. The separate packets that constitute a message may not travel the same path depending on traffic load. However, they all reach the same destination and are assembled in their original order in a connectionless fashion. This is in contrast to connection oriented routing modes, such as frame relay and asynchronous transfer mode (ATM) or voice.

It would be difficult for most people to remember the four separate numbers (sometimes having ten or more digits) comprising each numeric IP address. In addition numeric IP addresses occasionally change or some systems temporarily assign IP addresses to active devices, making it even more of a problem for people to keep track of them. To facilitate person to person communications, however, people can address each other using easier to remember names. In the presently preferred embodiments, these names may be textual domain names or telephone number based domain names, but other name formats are within the scope of the invention. A domain name server system 51 translates the names into actual IP addresses.

An example of a textual Domain Name is Evoit@HUT. MB. COM. Each of the names separated by a dot is called a domain. The significance of each of the domains is the reverse of that of the numeric IP address. In the numeric IP address, the most significant numbers were on the left and the least significant on the right. The textual Domain Name System begins with the least significant on the left and proceeds to the most significant on the right. An example of a telephone number based Domain Name is '301-608-2908@phone'.

The top-level domains, those of the most general significance, are as follows:

1. COM A commercial operation
2. EDU A university, college or other educational institution
3. GOV A government organization
4. MIL A military site 5. ORG Any organization that does not fit into any of the preceding 6. NET A network There are now two-letter domains, each denoting a different country, which are atop the above original domain names. An address ending in "COM.AU," for example, would be a commercial operation in Australia. Over a hundred different countries are now connected to the Internet so the list of two-letter country codes is long and getting longer. Computers or servers associated with the Internet convert textual domain names into numeric IP addresses.

In the example illustrated, the domain name server 51 translates domain names into numeric IP addresses in response to requests from calling terminals. FIG. 1 depicts a single domain name server 51, and the discussion herein concentrates on a single server implementation for ease of explanation. In an actual, large scale deployment, the domain name server system would comprise a number of server systems 51 in a hierarchical arrangement. Each domain name server 51 would serve a region or segment of the public packet data network 31 and would provide translations and conditional analysis processing of names corresponding to addresses residing within the segment served. Any computer or PC on the segment requesting translation would first query the domain name server system 51 serving that segment. If the domain name was not one associated with that server, the domain name server 51 would communicate through the hierarchy of such servers to relay the query to the appropriate server for processing; and after processing, that server would provide the destination address and any associated information in the reply back to the querying device. Also, each domain name server 51 in a given area could be duplicated, for redundancy.

As shown in simplified form in FIG. 1, the domain name server (DNS) 51 comprises a server computer which functions as the central processing unit of the domain name server. The computer has an IP packet data interface to the network 31. The DNS system 51 also includes a data storage system storing a series of databases attached to or incorporated into the server. The databases include look-up tables for direct translations of names to addresses and may include routing control records for conditional processing of requests for communication with at least some customers.

Essentially, when a person wishes to initiate a communication, they instruct their PC to start communication using a name address, either based on a textual name or a telephone number. The PC transmits a name translation request or 'query' to the domain name server system 51 via the appropriate access server 27 and the network 31. The server 51 receives the domain name query from the public packet data network 31. In response, the server may execute a direct look-up table based translation to an IP address and/or an associated telephone number, for example for voice communication. Also, for any called party customer who has established a more sophisticated routing service, the server 51 will execute conditional analysis in response to the domain name translation query, as disclosed in commonly assigned application Ser. No. 08/812,075 filed Mar.6, 1997 entitled "ENHANCED INTERNET DOMAIN NAME SERVER", the disclosure of which is incorporated herein entirely by reference. The domain name server 51 responds in the same way to translation queries from other nodes on the packet data network, such as the PSTN gateway(s) 45 and the wireless gateway system(s) 5.

One form of conditional analysis by the domain name server 51 involves checking a home location register to determine which of several possible locations to route a call to in order to reach the called customer. In accord with one aspect of the present invention, the access manager of the wireless gateway 5 will update home location register information, for example stored in or accessible through the domain name server system 51, for persons using the wireless handsets 1. In the embodiment illustrated in the drawing, the HLR information is maintained in a separate database 33 coupled to the public packet data network 31.

When a person initiates an outgoing call from one of the handsets 1, that is intended for routing through the public packet switched data network 31, the wireless gateway system 5 formulates and transmits the query through the network 31 to the domain name server 51. The server 51 returns the appropriate address information to the wireless gateway system 5, and the system S utilizes that information to establish the call through the network 31 to the destination, e.g. to the PC 31 or to a telephone 49.

When another person calls a subscriber, the person enters an address of a telephone number associated with the subscriber. The caller's PC 21 or a PSTN gateway 49 serving the caller formulates and transmits the query through the network 31 to the domain name server 51. The server 51 returns the appropriate address information to establish the call through the public packet data network 31 and the wireless gateway system 5. As discussed more below, in a highly automated call processing embodiment, the domain name server obtains the address information at least in part through an interaction with the HLR database 33.

The wireless gateway system of the present invention has a number of different applications. For example, in a business application for a single factory or office location, one system 5 shown in solid line form in FIG. 1 might provide internal telephone communications and connections for local and long distance telephone service. However, the roaming capability for service to the handsets 1 would be limited to the area in and around the factory or office location covered by the wireless communication range of the service through antennas 3. The system 5 would control handshaking, registration and validation procedures to limit service to only the handsets authorized by the owner of the system 5, e.g. to limit usage to employees.

Another application relates to public wireless access in some relatively public installation, such as an airport, shopping center, hotel/convention center complex or the like. In such a case, the operator of one gateway system 5 (solid lines) would supply temporary users with handsets 1 compatible with the system 5. The system 5 would control handshaking, registration and validation procedures and might limit service to only the handsets supplied by the system operator.

Alternatively, the wireless gateway system 5 might allow access using handsets other than those corresponding to the particular system 5, either in a business situation where the private operator has similar systems (one of which appears in phantom in FIG. 1) installed at other company locations or in a situation where the public wireless access provider allows handsets from other systems (shown in phantom lines) to access the gateway system 5. In any such application, the wireless gateway system 5 must verify authorization in some manner.

In an automatic verification mode, the system 5 communicates with a home location register (HLR) associated with the handset to verify authorization. In the preferred embodiment, a central database 33 accessible via the public packet switched data network 31 maintains the HLR records. The HLR database 33 provides verification and billing information to the wireless gateway system 5. The HLR database 33 also records the identity of the system 5 currently registering the handset 1, to facilitate routing subsequent calls to that handset. The HLR database 33 may be implemented in software in the domain name server computer, in a server similar to the domain name server 51 or in any other system accessible via the network 31. Alternatively, a server on the network 31, such as server 51, may access some other system that maintains the HLR for the particular handset 1. For example, the server might access HLR data in an Integrated Service Control Point of a public telephone network.

The wireless gateway system 5 may also support verifications based on prompts and customer inputs. For example, the system 5 may provide a tone or preferably a voice prompt to the handset 1 asking a registering customer to input their credit card number for billing. The wireless gateway 5 would then communicate with some server 35 coupled to the public packet switched data network 31 to access an appropriate credit card database and verify the credit card number. The credit card database server 35 appears as a separate server, but the credit card database may be an application running on any other convenient server, such as one of the servers 33, 51.

Specific examples of calls to and from the wireless gateway system 5 and the registration processing by the access manager and the domain name server system 51 will be described in more detail later. Next, consider the structure of the wireless gateway system 5 in somewhat more detail.

As shown in FIG. 2, the wireless gateway system 5 will include one or more Radio Port Control Units (RPCUs) 63. Each RPCU 63 connects to a number of cell cite base station transceivers 61 and associated antennas 3. Each base station 63 functions as a radio port to the serving RPCU 63. The base station transceiver includes the actual RF modulation and demodulation circuitry for RF telephone and signaling communication with a number of wireless handsets 1 within cellular coverage area. The RPCU 63 provides the interface between the base stations 61 and a telephone switch, such as the private branch exchange (PBX) 65, and provides control and signaling functions for implementing the air interface to the wireless handsets 1 through the base stations 61. A number of manufacturers offer localized wireless systems including the RPCUs and compatible base stations. Examples include the PPS-1800 System from Motorola, the Freeset Part 15 In-Building Wireless Business Communication system from Ericsson, and the Pocket Communications System from SpectraLink. In some implementations, these wireless communication elements may offer full cellular telephone-like service, e.g. with automatic handoff between cells, although simpler implementations are contemplated and within the scope of the present invention.

The PBX 65 provides voice telephone channel switching and associated signaling communication between the wireless communication elements of the system 5 and between those elements and other ports. The PBX 65 provides one or more basic rate interface (BRI) type ISDN telephone lines to each RPCU 63. The BRI line circuits to the RPCUs carry voice as well as data both for normal signaling and for control signaling exchanged between the RPCUs 63 and the access manager 67. The PBX 65 also provides two or more BRI line circuits to the packet service gateway 69 for voice and signaling relating to telephone calls that will go to or come in from the public packet switched data network 31. In addition, the PBX 65 provides a BRI line circuit to the access manager 67 for data communication, principally for control signaling between the access manager 67 and the RPCUs 63.

The PBX 65 preferably connects through a primary rate interface (PRI) type circuit to a central office 7 of the local public switched telephone network. The PBX 65 may also provide line circuits to one or more private telephone stations, such as the on-premises station 70 shown in FIG. 2. In the illustrated wireless gateway system 5, the PBX switching permits two-way voice calls between any two of the handsets 1 that are within range of the base stations 61. The PBX 65 also permits users of the handsets 1 to make and receive telephone calls, via the local public switched telephone network or through the packet service gateway 69 and the public packet switched data network 31. If the PBX 65 connects to local extension telephone stations 70, such as desk top telephone extensions, those extensions may also communicate with the handsets 1 or with telephones coupled to the local public switched telephone network. The system 5 also enables telephones 70 to communicate through the packet service gateway 69 and the public packet switched data network 31 either with voice capable data terminal devices or with remote telephones accessible through PSTN gateways 45.

In the illustrated preferred implementation of the wireless gateway system 5, the PBX 65 is an ISDN type PBX. Other types of PBXs could be used in place of the ISDN PBX.

The packet service gateway 69 is similar in structure and operation to the PSTN gateway 45. However, in the preferred embodiment, the localized wireless gateway system S serves a smaller number of telephones and carries a lower volume of traffic to and from the network 31 than that carried through the CO switches 47 and the PSTN gateway 45. The gateway 69 therefore is traffic engineered for smaller scale operation than the gateway 45. For example, the initial implementation of the PSTN gateway 45 is a multi-computer server system, whereas the packet service gateway 45 is a single computer or server having the appropriate interface cards and software.

Figure 3A:
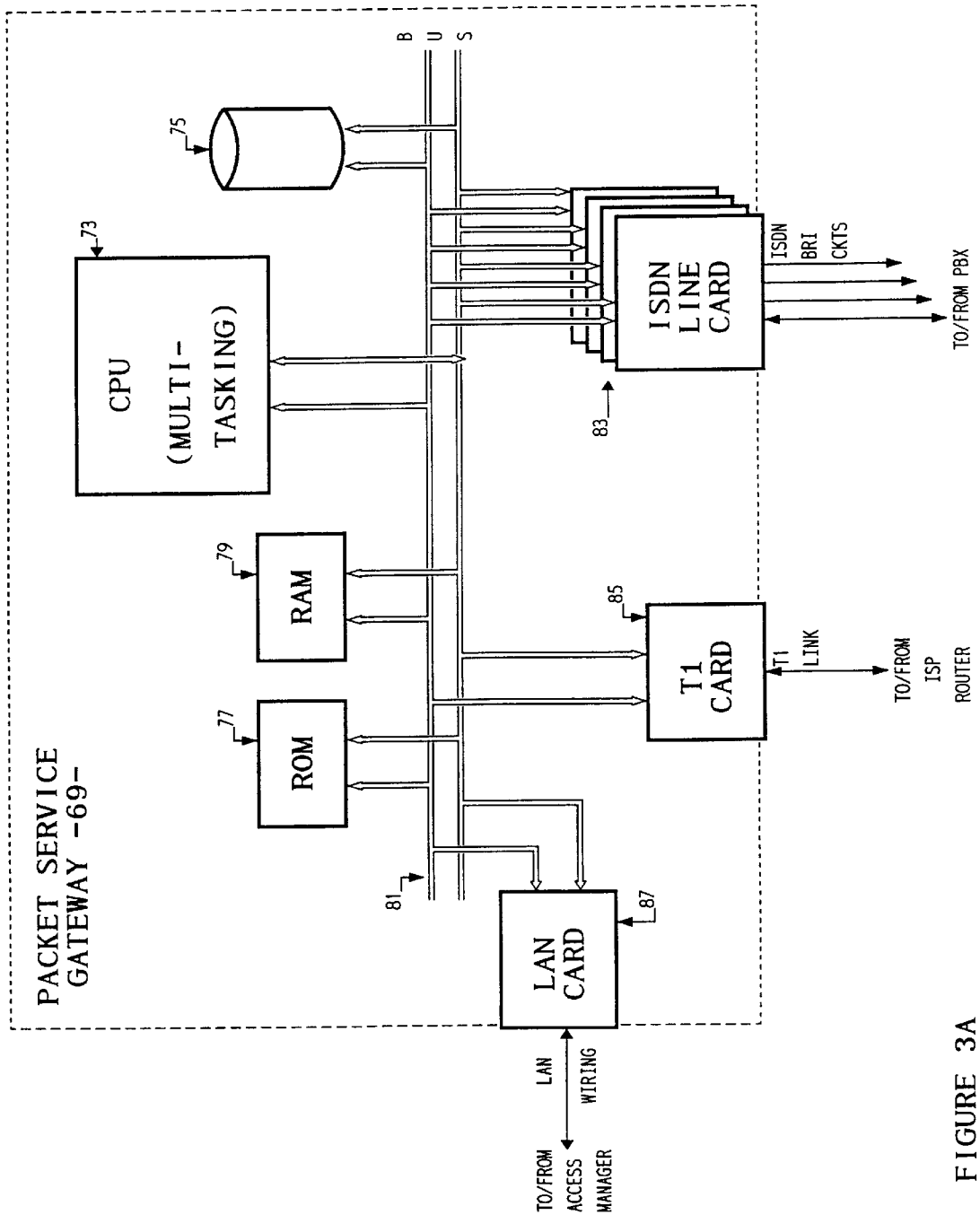
FIG. 3A is a functional block diagram of one hardware implementation of the packet service gateway portion of the system of FIG. 2.

FIG. 3A provides a simplified block diagram of the structural elements of a preferred implementation of the packet service gateway 69. Essentially, the gateway 69 is a computer having a multi-tasking central processing unit (CPU) 73, a disc drive system 75 for program and mass data storage, a read only memory (ROM) 77 and a random access memory (RAM) 79. A standard internal bus system 81 provides address, signaling and data communications between the elements of the gateway computer. The computer executes a variety of software routines, discussed below, to perform the various gateway functions and provide communications via the various inputs and outputs.

In the illustrated example, the computer serving as the packet service gateway 69 has three types of interfaces to other systems or devices. First, the gateway 69 includes a number of ISDN line interface cards 83. Each of these cards 83 provides a two-wire, line sided interface to a basic rate interface (BRI) type integrated services digital network (ISDN) line. The line cards 83 permit transmission and reception of either data or digitized voice over each of two (B) channels at 64 kbits/s as well as transmission and reception of signaling data over a (D) channel at 16 kbits/s. If the packet service gateway 69 handles enough calls, the BRI line cards and the associated lines to the PBX 65 could be replaced with one or more primary rate interface cards and an associated PRI circuit to the PBX.

Second, the computer serving as the packet service gateway 69 includes a T1 card 8s. The card 85 provides a four-wire connection to a dedicated T1 circuit which provides two-way data communication at 1.544 Mbits/s. The T1 circuit connects to a router (not shown) on the public packet switched data network 31, typically a router operated by an ISP. As discussed more below, the T1 circuit carries digitized, packetized voice information as well as related signaling data for communications through the network 31. The various types of packet data on the T1 link utilize TCP/IP packets and addressing. If traffic warrants, the gateway 69 may include additional T1 cards for connection to and communication over additional T1 circuits or another type of card providing a higher rate interface (T3, etc.) to the public packet switched data network 31.

In the illustrated embodiment, the computer serving as the packet service gateway 69 includes a third interface, the local area network card 87. The LAN card 87 connects to LAN wiring running between the gateway 69 and the access manager 67, for example, to permit the access manager to send and receive certain signaling messages via the public packet switched data network 31. In the preferred embodiment, the LAN is a 10baseT Ethernet LAN. The LAN card 87 provides the physical interface to the LAN wiring as well as any necessary protocol conversions between the protocols used on the internal bus 81 and the protocols used on the LAN.

In an alternative embodiment, the data link between the access manager 67 and the packet service gateway 69 could be replaced with a data link via the BRI lines and the PBX 65. In such a case, the LAN would be eliminated, and the packet service gateway 69 would not include the LAN card 87. The advantage to the use of the LAN is that the LAN provides higher data rate communication between the access manager 67 and the packet service gateway 69 than is available over ISDN BRI type circuits.

Figure 3B:
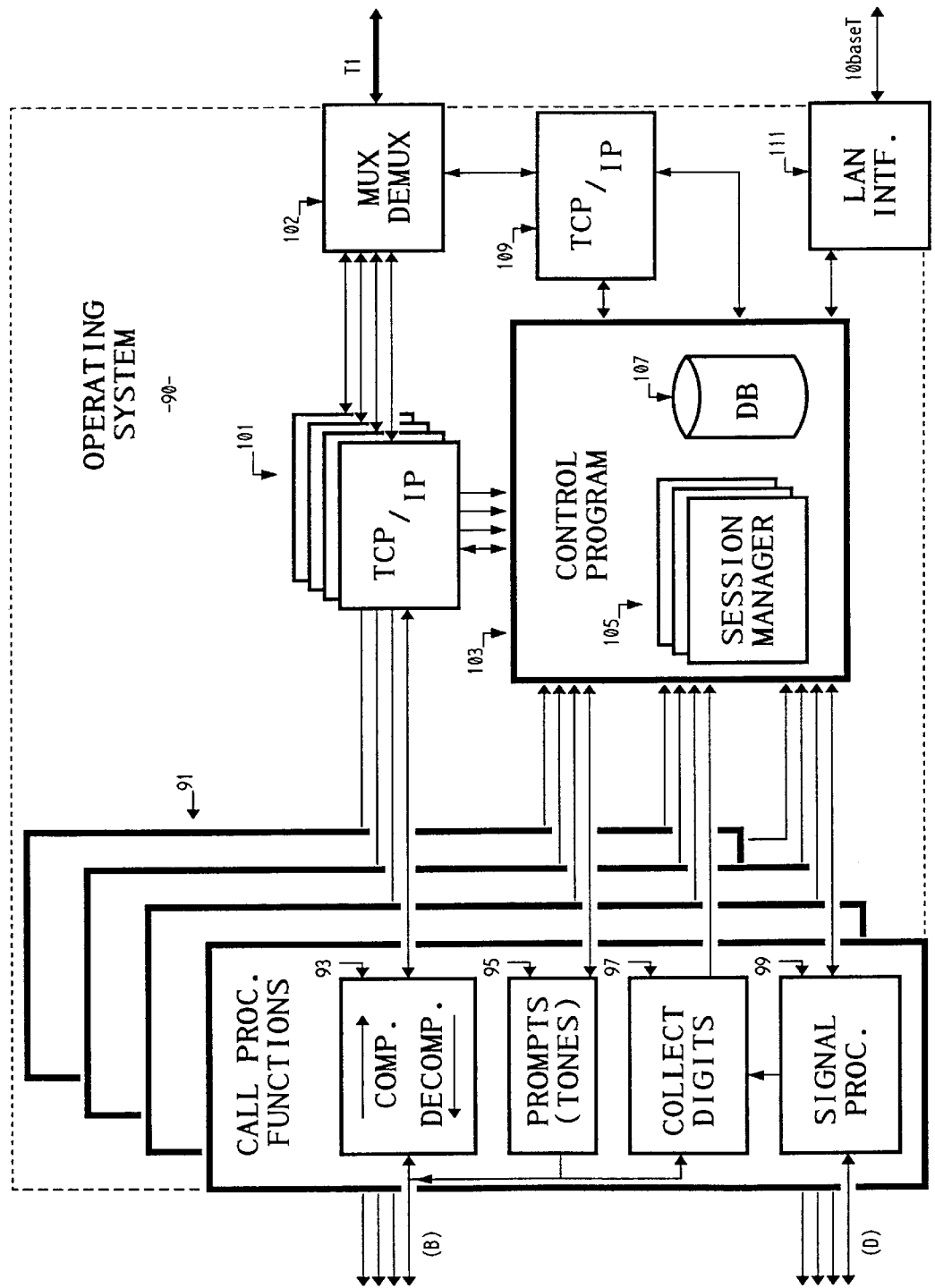
FIG. 3B is a logical diagram useful in explaining the software functionality of the packet service gateway.

FIG. 3B provides a block/flow diagram illustration of the functions implemented by the software running on the packet service gateway computer. The computer of the packet service gateway 69 runs a standard operating system 90, such as UNIX. The operating system facilitates execution of one or more application programs. The various application programs include executable code facilitating the actual processing as well as necessary data. Although the computer may run other application programs, to perform unrelated communication functions, for purposes of this discussion the application programs that will run on the computer of the gateway 69 relate to the telephone communications through the TCP/IP packet data network 31.

The software provides a number of call processing function routines 91 for processing incoming and outgoing calls via the ISDN line cards 83. Typically, there is a single program or routine for the call processing functions stored in disc drive system 75, but this routine 91 may be called repeatedly and running from RAM 79 as a number of separate copies for processing of simultaneous calls through a number of the ISDN interface cards 83.

Each of the call processing functions 91 includes subroutines 93 for compression and decompression. Each compression and decompression routine 93 compresses voice frequency information received via each B channel of one of the BRI type ISDN line circuits to a desired rate for transport over the packet network 31, for example down to rates between 2 and 16 kbits/s. The routine 93 also decompresses voice data received via the network 31 for uncompressed digital transport over one of the B channels.

The disc drive system 75 stores digitized voice prompt messages, for use during processing of certain types of calls by the packet service gateway 69. For this purpose, the call processing functions 91 include a subroutine 95 for transmitting such prompts over the B channel to persons using the packet service gateway 69. The subroutine 95 may also produce various tone signals, for example to simulate tones heard during processing of telephone calls.

The call processing function routines 91 also include a subroutine 97 for collection of digits input by users. The digits typically arrive via D channel signal processing routine 99, but in some cases the packet service gateway 69 may receive digits as dual tone multifrequency signals contained in the B channel voice frequency information.

The combination of prompts 95 and digit collection 97 permits a number of interactive call processing services. For example, in some situations it may be desirable to prompt a caller for input of a PIN and collect and check digits purportedly representing the PIN, before permitting an outgoing long distance call. Also, the prompt and digit collection functions permit the system to obtain a credit card number (and possibly an associated PIN) for billing calls through the system to and from persons using the system 5 only on a temporary basis and using handsets not normally associated with and recognized by the particular system.

In addition to the above mentioned digit collection, the signal processing routine 99 provides two-way ISDN signaling via the D channel of each BRI type ISDN line circuit. The D channel carries standard ISDN call related signaling messages. For example, incoming signals from the PBX 65 may indicate a new incoming call on one of the associated B channel and identify the call as a data call or a voice call. The signals for such a call typically include the dialed number as well as a number associated with the origin of the call, for example identifying one of the handsets 1 or at least the B channel assigned through the PBX 65 to an RPCU 63 for a particular call. Signals transmitted from the gateway 69 to the PBX 65 include requests for B channels to make calls through the PBX and destination digits, such as the number of one of the handsets 1 or preferably a telephone number for a channel to an RPCU 63 temporarily assigned to a called handset.

The software running on the computer of the packet service gateway 69 includes a control program 103. The control program 103 includes high level control software, session managers 105 as well as one or more databases 107 storing relevant control information. The control program 103 initiates one session manager routine 105 for each call in progress. The session manager receives and processes various signals from the call processing function routines 91 and provides the necessary instructions to those routines to execute each individual call processing function. The control program 103 also controls or administers TCP/IP addressing functions and initiates certain necessary signaling communications through the network 31, as will be discussed more latter.

The software running on the computer of the packet service gateway 69 also includes routines 101 for TCP/IP processing of the compressed voice channel information. Typically, there is a single program or routine for this TCP/IP processing function stored in disc drive system 75, but this routine may be called repeatedly and running from RAM 79 as a number of separate copies for simultaneous processing of voice data for a number of concurrent telephone calls. Each running TCP/IP processing routine 101 performs the two-way protocol processing to send and receive compressed, digitized voice data in TCP/IP packet form over the packet network 31. Each routine 101 supplies outgoing TCP/IP packets to a MUX/DEMUX routine 102. For outgoing traffic, the routine 102 serves as a multiplexer which aggregates and frames the TCP/IP packets for transmission over the T1 circuit. For incoming packets, the routine 102 serves as a demultiplexer. The routine 102 strips the T1 framing, separates out the packets relating to each two-way voice communication and routes the packets to the appropriate TCP/IP processing routine 101.

The software running on the computer of the packet service gateway 69 also provides an interface 111 for communication to and from a LAN, typically a 10baseT Ethernet LAN connected to the access manager 90. Via this interface routine 111 and the LAN, the control program 105 of the packet service gateway 69 can exchange control and status messages with the access manager 67. The packet service gateway 69 can also act as an Internet access server permitting the access manager 67 to send and receive messages over the network 31.

There are some circumstances in which the packet service gateway 69 will transmit signaling messages via the public packet switched data network 31. There also are some situations in which the access manager 67 transmits and receives messages through the gateway 69 and the network 31. For these purposes, the software also includes a TCP/IP routine 109, controlled by the program 103, for TCP/IP packet processing of signaling messages to and from the control program 103. The routine 109 encapsulates datagrams from the control program 103 in TCP/IP packets and supplies those packets to the MUX/DEMUX routine 102 for incorporation into the T1 rate stream going to the network 31. The MUX/DEMUX routine 102 demultiplexes out any packets addressed for the control program 103 or the access manager 67 and supplies those packets to the TCP/IP processing routine 109. The TCP/IP processing routine 109 in turn strips off the TCP/IP packets and provides any incoming datagrams to the control program 103, for internal processing by the program 103 or for forwarding through interface routine 111 to the access manager 67.

Figure 4:
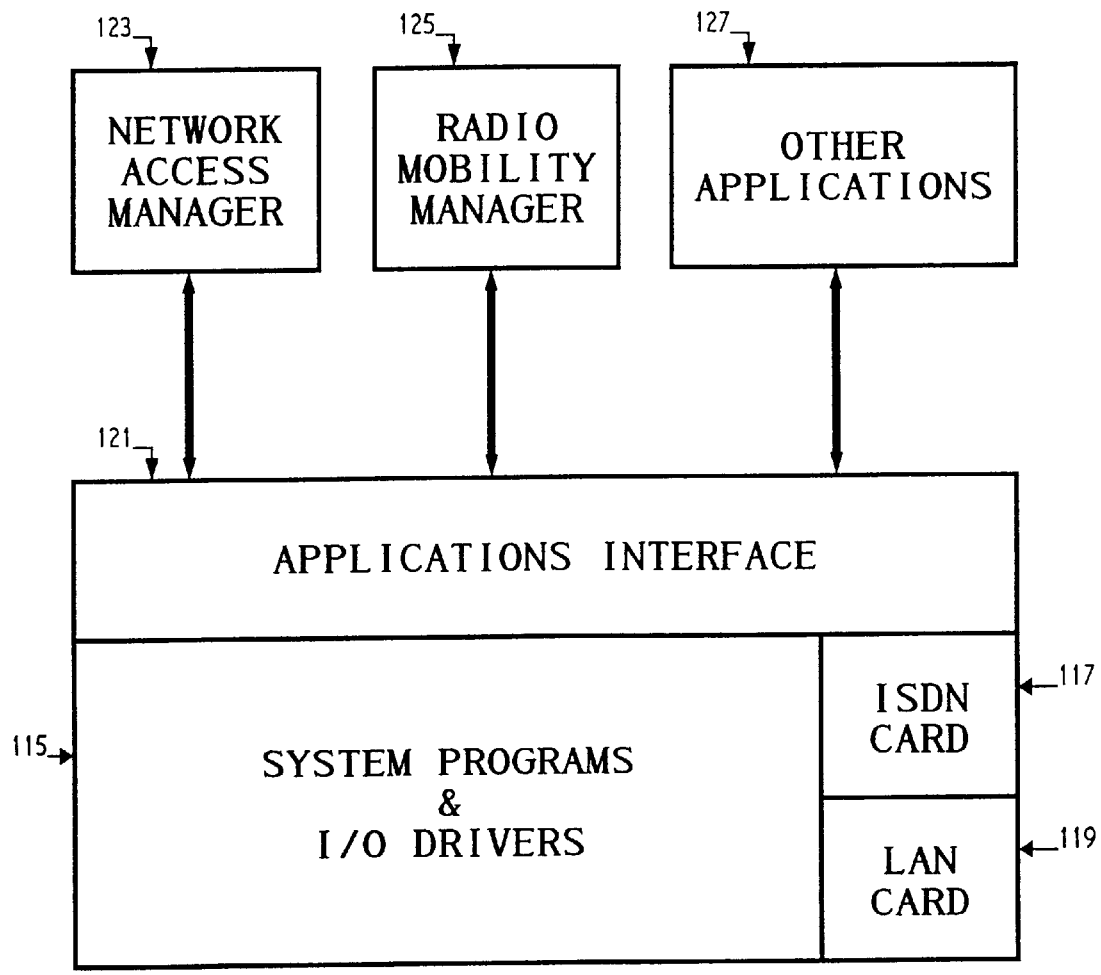
FIG. 4 is a diagram illustrating the software and the relationship thereof to certain components of the access manager of the system of FIG. 2.

In the presently preferred embodiment, the access manager 67 comprises a separate computer having a BRI interface card and a LAN interface card. The BRI card provides the ISDN line interface to the PBX 65, and the LAN interface card provides two-way data communication between the access manager 67 and the packet service gateway 69. FIG. 4 provides a block diagram illustration of the software of the access manager and illustrates the relationship thereof to the interface cards within the access manager computer.

With reference to FIG. 4, the software running on the computer serving as the access manager 67 includes system programs and input/output (I/O) drivers 115. This portion 115 of the software includes an operating system, such as UNIX, as well as corresponding driver routines for the particular line cards 117 and 119. In the illustrated example, the access manager includes one ISDN line card 117 and one LAN card 119. The ISDN card 117 may be similar to the ISDN line cards 83 discussed above, and the LAN card 119 is essentially the same as the LAN card 87 discussed above, although the two cards have different addresses on the LAN. The driver software and the ISDN card 117 provide two-way data communication software over the BRI type ISDN line circuit through the PBX 65, principally for control signaling between the access manager 67 and the RPCUs 63. The LAN card 119 and the associated driver software facilitate data communications between the access manager 67 and the packet service gateway 69, for control signaling and to permit the access manager to send and receive messages via the public packet switched data network 31.

The software running on the computer serving as the access manager 67 includes an applications interface 121 for interfacing a series of application programs 123, 125, 127 to the system programs and driver 115. For purposes of wireless gateway system operations, the application programs include a network access manager 123 and a radio mobility manager 125, although there may other applications 127 if the computer is performing functions in addition to the access manager operations.

The network access manager 123 provides wireline network call control and data management. The network access manager 123 is designed to work with a particular PBX, in this case an ISDN PBX 65. Preferably, the network access manager 123 is independent of the particular type of radio equipment used.

The radio mobility manager 125 provides radio network control functions and is adapted to control the specific radio equipment incorporated in the particular installation. The radio mobility manager 125 controls the following functions: configuration of base station transceivers and associated channels, assigning channels, paging, and portions of automatic link transfers operations.

Consider now the operations of the wireless gateway system of the present invention.

As noted above, some applications of the wireless gateway system 5 will allow access only to handsets associated with the one localized system 5. In such a case, the access manager 67 maintains the data tables necessary for authentication of the handsets 1. Alternatively or in addition, the system may permit other users to temporarily use the system in response to verification of a credit card for billing purposes. In such a case, the access manager 67 would maintain tables of information relating to handsets for which credit card payment has been verified. For purposes of discussion of detailed operational examples, however, assume that the system permits roaming and performs an automatic verification of handsets 1 through interaction with an HLR database 33.

The database 33 maintains subscriber data files, which substantially correspond to the "Home Location Register" data commonly used in cellular systems to validate service requests for each mobile telephone. For actual communication, a number of wireless gateway systems 5 treat each subscriber's handset 1 as a roamer. Such systems 5 may operate, for example, in a company's offices and/or factories at separate geographic locations. The access manager 67 in each gateway system 5 maintains "Visitor Location Register" (VLR) type information for each handset 1 registered as active in the area(s) served by the particular wireless gateway system 5.

In an active standby mode of operation, the circuitry in each handset 1 monitors signals broadcast from the cell cite antennas 3 indicating the registration zone in which the handset 1 currently is located. When the handset circuitry determines that the handset 1 has just entered a new zone or that the handset 1 has just been turned on, the circuitry initiates a handset registration procedure. The handset 1 transmits a radio message, requesting registration and identifying the handset 1, over a signaling channel to the RPCU 63 which controls wireless service in the particular zone. The RPCU 63 in turn forwards the registration request message, via the PBX switch 65, to the access manager 67.

The access manager 67 checks its Visitor Location Register files to determine if the identified handset 1 has previously registered with that access manager. For example, if the handset 1 has registered with the access manager 67 but for a different registration zone served by the particular access manager, the Visitor Location Register for that handset is simply updated to show the new zone in which the handset 1 is operating.

If the handset 1 has not registered with the particular access manager 67, the access manager transmits a message requesting validation to the HLR database 33. Specifically, the access manager 67 transmits the message over the LAN connection to the packet service gateway 69. The packet service gateway 69 recognizes the message as a signaling message for transmission over the packet switched data network 31. The packet service gateway 69 converts the message to TCP/IP packet format, with the appropriate IP address for the HLR database 33 and multiplexes the packet (s) into the portion of the T1 stream going out to the network 31. The network 31 in turn routes the packet(s) of the message to the HLR database 33.

The database 33 responds much the same way that a home mobile telephone switching office having a normal cellular subscriber's home location register responds, by providing validation and service profile information regarding the particular wireless handset 1. The server or other system maintaining the HLR database 33 transmits TCP/IP packets containing the validation and service profile information back through the public packet switched data network 31 to the packet service gateway 69, and the gateway 69 supplies the information from the packets over the LAN to the access manager 67. The access manager 67 stores the service profile information in a visitor location register which it assigns to the particular handset 1, and then the access manager sends an acknowledgment message via the RPCU 63 indicating that the handset is now registered. The access manager 67 uses the stored profile information to control services on subsequent calls to and from the handset 1 and to bill for the services.

At this time, the database 33 updates the location registration data portion of the subscriber's home location register with identification data for the access manager 67 and the wireless gateway system 5, to indicate the current point at which the handset 1 is registered. The HLR database 33 may also send a de-registration message to the last known access manager in contact with the wireless handset 1.

Consider now several call processing examples.

When a subscriber wishes to make a call, the subscriber enters the digits for the destination number and activates a transmit function whereby the handset 1 sends the dialed digits through a base station 61 to the nearest RPCU 63. The RPCU 63 forwards the digits and the identification of the handset 1 to the PBX 65 as a service request. The PBX 65 forwards the digits and handset identification data to the access manager 67. The access manager 67 checks its data files to determine if the calling handset 1 is registered, and if not registered the access manager initiates a registration procedure of the type discussed above.

When the calling handset 1 is registered, the access manager 67 checks the service profile stored in the visitor location register assigned to the handset to determine if the caller is entitled to make the particular call. For example, the access manager 67 might determine whether the call is a local call, a long distance call or an international call and whether or not the particular customer has subscribed to the corresponding class of service. If the call involves a switch provided special service, such as conference calling, the access manager 67 checks the service profile in the visitor location register to determine if the subscriber is authorized use of that special service. If the data stored in the visitor location register indicates that the requested call should go through, the access manager 67 instructs the RPCU 63 to connect the radio channel currently allocated to the calling handset to a specific ISDN channel and instructs the switch to complete the call as dialed.

In the simplest case, the PBX 65 completes a connection to dispose of the call. For example, the PBX may complete the call to an on-premises telephone station 70, as a normal PBX extension call. If the caller dialed a local number outside the PBX, the PBX 65 connects the call to a channel on the PRI circuit to the central office 7 serving as the end office for local calls to and from the wireless gateway system 5. The PBX supplies the dialed digits over that channel to the central office 7, and that office connects the call to a local telephone 9, in the normal manner.

If the call is directed to a handset 1 currently registered as active on the same wireless gateway system 5, the system 5 will connect the call between the two handsets through the PBX 65 and one or more of the RPCUs 63. Specifically, the access manager 67 allocates a channel through an RPCU 63 and a base station transceiver 61 to the called handset 1 and instructs the PBX 65 to make the connection between the channels assigned to the called and calling parties handsets.

A key feature of the present invention relates to routing of outgoing and incoming calls via the wireless gateway system over the public packet switched data network. Consider first some examples of outgoing calls. Assume for a first example that the authorized outgoing call from a wireless handset 1 is intended for a user at PC 21, which has voice communication capabilities. In such a case, after the authorization processing by the access manager discussed above, the access manager 67 instructs the PBX 65 to connect the call to the packet service gateway 69. When the PBX makes this connection, the PBX 65 supplies call related information such as calling party number over the ISDN D channel. Of particular note here, the call related information supplied to the packet service gateway 69 includes the dialed destination telephone number.

The packet service gateway 69 utilizes the received information to initiate communication via the public packet switched data network 31. The packet service gateway 69 transmits a translation request or 'query' to an appropriate server. The server may be an Internet telephone service registration server. In the preferred embodiment, the domain name server system 51 performs the telephone number to IP address translations, therefore the packet service gateway 69 transmits the translation query to the domain name server system 51 via the public packet switched data network 31.

The server 51 receives the a query from the public packet data network 31. If a called party customer has established a more sophisticated routing service, the server 51 may execute a conditional analysis in response to the domain name translation query, as discussed in detail in the above cited application Ser. No. 08/812,075. However, for this discussion assume that the called party using PC 21 does not have such a service, in which case, the server 51 executes a direct look-up table based translation to an IP address for the PC 21. If the PC 21 does not have a permanently assigned address, the server 51 may obtain a temporary address for the terminal from a Dynamic Host Configuration Protocol or 'DHCP' server (not shown).

Having obtained the IP address of the destination terminal, the address of the PC 21 in the present example, the server system 51 formulates a response message containing the IP address in one or more TCP/IP packets and transmits the message back through the public packet data network 31 to the packet service gateway 69. The gateway 69 uses the received IP address to transmit a signaling message through the public data network 31 and the appropriate access server 27 to the PC 21 indicating a call to that destination terminal.

The message may include information regarding the call, such as the telephone number or an identification number associated with the handset 1. If on and available to receive calls, the PC 21 provides appropriate audible and/or visual notice of the call to the called user. Any call notification display would include the information relating to the calling handset 1, if such information is included in the signaling message. The PC 21 sends back a status message through the network 31 to the packet service gateway 69 indicating that it is notifying the called party. At this time, the packet service gateway 69 transmits a tone signal simulating a telephone ring-back tone through the B channel, the PBX 65, the RPCU 63, the base station 61 and the radio link to the handset 1. The calling party hears ringing.

If the called user activates the PC 21 to accept the incoming call, the PC 21 transmits a signaling message back through the public packet data network 31 notifying the packet service gateway 69. The gateway 69 stops transmission of the ring-back tone to the calling party's handset 1 and initiates two-way voice communication between the ISDN link assigned to the call through the PBX 65 and the packet data network 31.

Specifically, the gateway 69 compresses outgoing digitized voice frequency signals, packetizes the compressed digital data into TCP/IP packets and transmits the packets through network 31 using the IP address of the PC 21. The PC 21 processes the received packets to capture the digitized and compressed data and reproduce the voice frequency signals as an audio output through the speaker(s) 25. In the opposite direction, the PC 21 digitizes voice frequency information received via microphone 23. The PC 21 compresses those digitized signals, packetizes the compressed digital data into TCP/IP packets and transmits the packets through network 31 to the packet service gateway 69. The gateway 69 processes the received packets to capture the digitized and compressed data, decompresses the data and transmits the data over the B channel link through the PBX to the handset 1.

Consider now a call from the handset 1 to a normal telephone 49 via the packet switched data network 31. Again the user dials a telephone number using handset 1, and the handset 1 sends a signaling message containing the number to the system 5. The wireless gateway system internally verifies authenticity, establishes communication between the handset 1 and the packet service gateway 69 and supplies the call related information to the packet service gateway 69, as in the earlier example. The packet service gateway 69 transmits a translation query to an appropriate server, preferably the domain name server system 51. The domain name server system 51 performs the telephone number to IP address translations, in this case to identify the IP address of a PSTN gateway 45 providing an interface to the local telephone network in the area encompassing the called is station 49.

The domain name server system 51 formulates a response message containing the IP address in one or more TCP/IP packets and transmits the message back through the public packet data network 31 to the packet service gateway 69. The gateway 69 uses the received IP address to conduct a signaling communication through the public packet data network 31 with the PSTN gateway 45.

As part of the signaling communication, the packet service gateway 69 supplies the dialed telephone number to the PSTN gateway 45. The PSTN gateway 45 initiates a voice telephone call to the telephone 49 through one or more COs 47 of the local public switched telephone network serving that gateway 45. If the line to telephone station 49 is busy, the CO(s) 47 return a busy signal through tone or D channel signaling. The PSTN gateway 45 detects this busy signal and transmits an appropriate status message back through the packet data network 31 to the packet service gateway 69 indicating the busy condition. In response to the busy status message, the packet service gateway 69 transmits a tone signal simulating a telephone 'busy' signal through the PBX 65, the RPCU 63 and the radio link to the handset 1. The calling party hears the busy signal.

If the called station 49 is available, the serving end office 47 applies a ringing signal to the line to that station and sends a ring-back tone or D channel ring-back message to the PSTN gateway 45. The PSTN gateway 45 detects this ring-back signal and transmits an appropriate message back through the packet data network 31 to the packet service gateway 69 indicating the ringing condition. In response to the ringing status message, the packet service gateway 69 transmits a tone signal simulating a telephone ring-back tone through the PBX 65, the RPCU 63 and the radio link to the handset 1. The calling party hears ringing.

When someone answers the call at telephone station 49, for example by taking the handset off-hook, the serving central office 47 detects this condition as a 'ring-trip'. In response, the central office removes the ringing signal from the called line, and the same or a different office serving the PSTN gateway 45 removes the ring-back signal from line connected to the PSTN gateway 49. The local telephone network including the of office(s) 47 provide a voice communication link between the PSTN gateway 45 and the line to the off-hook telephone 49.

The PSTN gateway 45 senses the off-hook condition, either by signaling from its serving end central office 47 or by detection of the end of the ring-back tone. Upon so detecting an answer by the party at station 49, the PSTN gateway 45 transmits another status message through the packet data network 31 to the packet service gateway 69 indicating the answer condition. In response to the answer status message, the packet service gateway 69 removes the simulated ring-back tone. Both the PSTN gateway 45 and the packet service gateway 69 begin two-way voice frequency signal processing and associated two-way transmission of TCP/IP packets containing compressed voice frequency information. The user at handset 1 can talk to the answering party at telephone station 49, in a normal conversational manner.

In the above described application with HLR verification, the domain name server system will perform a conditional analysis, to access the HLR location information, on incoming calls directed to users of the handsets 1. Consider now an example of a call from the PC 21.

When a person wishes to initiate a communication, they instruct their PC to start communication using a name or telephone number based address. The PC transmits a translation request or 'query' to the domain name server system 51 via the appropriate access server 27 and the public packet data network 11. The server 51 receives the domain name query from the public packet data network 31. In response, the server may execute a direct look-up table based translation to an IP address or telephone number. However, for any called party customer who has established a more sophisticated routing service, the server 51 will execute conditional analysis in response to the domain name translation query.

In its simplest form, if the conditional analysis produces a first result, the server 51 translates a textual or telephone number based name included in the query into a first destination IP address. If the conditional analysis produces a second result, the server 51 translates the name included in the query into a second destination IP address. The server then transmits a response message containing the first or the second destination address to a calling PC. The PC uses the received IP address to establish the desired communication through the public packet data network 31.

In the present example, the simplest translation result might result in call routing to another voice capable PC (not shown) or to the telephone station 49. Alternatively, the called party's routing control record stored in the domain name server system 51 will result in accessing that party's home location register (HLR) in the database 33. The location information in the HLR always identifies a current registration location for the called party. The location may be that of a landline telephone 9 or 47 or at a PC similar to PC 21.

However, for the present example, assume that the registered location identifies the wireless gateway system 5. The HLR database 33 accesses its stored data tables to determine the access manager 67 with which the called party's handset 1 is currently registered. Next, the database 33 sends a routing request message to the identified access manager through the network 31 asking for a specific telephone number to use in routing the call. The access manager 69 checks its data files to determine which registration zone the called handset 1 is currently registered in and sends a broadcast page request through the FBX 65 to the RPCU 63 servicing that registration zone. In response, the RPCU 6S broadcasts a paging signal requesting an answer from the identified handset 1. The handset 1 transmits a response to the page, and the RPCU 63 so notifies the access manager 67.

The access manager 67 allocates an ISDN channel for the incoming call and instructs the RPCU 63 to accept an incoming call for the handset 1 on the allocated ISDN channel. The access manager 67 also instructs the RPCU 63 to reserve one of the available voice channels for the call. At the same time, the access manager 67 transmits a telephone number identifying the allocated ISDN channel back up to the HLR database 33 for use as a routine number.

The database 33 now transmits the address of the packet service gateway 69 and the allocated routing telephone number as a response message, contained in one or more TCP/IP packets, back through the public packet data network 31, in this case to the calling PC 21. The PC 21 uses the IP address to transmit a signaling message through the public packet data network 31 to the packet service gateway 49 indicating an incoming call. The message includes the telephone number allocated to the called handset 1.

In response to the message from the calling PC 21, the packet service gateway 69 initiates an extension call through the PBX 65 using the allocated telephone number. The PBX treats the call as a normal line-to-line (B channel to B channel) call and provides a connection from the gateway 69 to the identified RPCU 63. That RPCU 63 recognizes the call for the allocated B channel as a call to the identified handset 1. In response, the RPCU 63 transmits a message to the handset indicating an incoming call and joins the incoming ISDN channel to the radio frequency voice channel when the called party answers.

While the handset 1 is ringing, the PBX provides an appropriate status message to the packet service gateway 69 via the D channel. The gateway 69 in turn transmits a status message through the network 31 to the calling PC 21. When the called party answers the call at the handset 1, the handset signals the RPCU 63, and the RPCU 63 provides an appropriate message over the D channel to the PBX 65. The PBX informs the packet service gateway 69 of the answer condition by a D channel message and provides a B channel connection for two-way voice communication between the gateway 69 and the handset 1.

The packet service gateway 69 responds to the message indicating an answer at the called handset 1 by transmitting a message through the public packet data network 31 to the calling device, in this case to the PC 21. This message informs the PC 21 of the answer condition. In response to the answer status message, the PC 21 commences its two-way voice processing and communication of compressed voice data via the public packet switched data network 31. The packet service gateway 69 also begins its two-way voice frequency signal processing and associated two-way transmission of TCP/IP packets containing compressed voice frequency information. The user at handset 1 can talk to the calling party at PC 21, in a normal conversational manner.

Consider now a call from a person using a normal telephone, such as telephone station 49. The calling party dials a telephone number assigned to the called party, and the central offices 47 of the public switched telephone network route the call to the PSTN gateway 49. The gateway 49 receives the dialed number in a signaling message from the central office 47. (Alternatively, the caller could dial a number assigned to the PSTN gateway 49 and then input the called party number in response to a tone or prompt from that gateway.)

The PSTN gateway 45 transmits a translation query to an appropriate server, preferably the domain name server system 51. The server 51 receives the domain name query from the public packet data network 31. As in the example of a call from the PC 21 to the handset 1, the domain name server executes a conditional analysis process which in this example results in accessing the called party's home location register (HLR) in the database 33. The location information in the HLR always identifies a current registration location for the called party. The location may be that of a landline telephone 9 or a PC similar to PC 21, but for the present example, assume again that the registered location identifies the wireless gateway system 5.

The HLR database 33 accesses its stored data tables to determine the access manager 67 with which the called party's handset 1 is currently registered. Next, the database 33 sends a routing request message to the identified access manager through the network 31 asking for a specific telephone number to use in routing the call. The access manager 69 checks its data files to determine which registration zone the called handset 1 is currently registered in and sends a broadcast page request through the PBX 65 to the RPCU 63 servicing that registration zone. In response, the RPCU 65 broadcasts a paging signal requesting an answer from the identified handset 1. The handset 1 transmits a response to the page, and the RPCU 63 so notifies the access manager 67.

The access manager 67 allocates an ISDN channel for the incoming call, instructs the RPCU 63 to accept an incoming call for the handset 1 on the allocated ISDN channel, and instructs the RPCU 63 to reserve an available voice channel for the call. At the same time, the access manager 67 transmits a telephone number identifying the allocated ISDN channel back up to the HLR database 33, and the database 33 supplies the IP address of the packet service gateway 69 and the actual routing telephone number through the public packet data network 31, in this case to the PSTN gateway 45. The PSTN gateway 45 uses the IS address to transmit a signaling message through the public data network 31 to the packet service gateway 69 indicating an incoming call. The message includes the telephone number allocated to the called handset 1.

In response to the message from the PSTN gateway 45, the packet service gateway 69 initiates an extension call through the PBX 65 and the RPCU 63 using the allocated telephone number, as in the earlier example. RPCU 63 transmits a message to the handset indicating an incoming call and joins the incoming ISDN channel to the radio frequency voice channel when the called party answer.

While the handset 1 is ringing, the PBX provides an appropriate status message to the packet service gateway 69 via the D channel. The gateway 69 in turn transmits a status message through the network 31 to the PSTN gateway 45. At this time, the PSTN gateway 45 transmits a tone signal simulating a telephone ring-back tone through the central office(s) 47 to the calling party's is telephone 49, so that the calling party hears ringing. When the called party answers the call at the handset 1, the handset signals the RPCU 63, and the RPCU 63 provides an appropriate message over the D channel to the PBX 65. The PBX informs the packet service gateway 69 of the answer condition by a D channel message and provides a B channel connection for two-way voice communication between the gateway 69 and the handset 1.

The packet service gateway 69 responds to the message from the PBX 65 by transmitting a status message through the public packet data network 31 to the calling packet data device, which in this case is the PSTN gateway 45. This status message informs the PSTN gateway 45 of the answer condition. In response to the answer status message, the PSTN gateway 45 removes the simulated ring-back tone. Both the PSTN gateway 45 and the packet service gateway 69 begin two-way voice frequency signal processing and associated two-way transmission of TCP/IP packets containing compressed voice frequency information. The user at handset 1 can talk to the calling party at telephone station 49, in a normal conversational manner.

The registration with the access manager and the maintenance of location registration information in the HLR database facilitates roaming from one wireless gateway system to another. As the user roams, the handset periodically registers with one of the access managers, and each access manager performing a registration provides a location update notice to the HLR database as part of the verification operation. In response to each query for translation relating to the called subscriber's handset, the conditional analysis processing by the domain name server system 51 and the retrieval of location registration information through the HLR database 33 and the access manager 67 result in routing of each call through the public switched packet data network 31 to the user's current location.

The present invention admits of a wide range of modifications, within the scope of the appended claims. For example, the illustrated wireless gateway system utilizes a separate packet service gateway 69 and access manager 67. Depending on the capacity of the computer used to implement the packet service gateway and the amount of expected traffic, the gateway computer could run the application programs attributed to the access manager to eliminate the need for a separate processor. Also, for an appropriate traffic level, separate switching may be unnecessary, and the processor in the packet service gateway could provide routing between ports connected to an RPCU or directly to the base stations. Such an implementation would eliminate the need for the PBX and possibly even the need for the RPCU(s).

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

We claim:

1. A method comprising:
   registering a wireless telephone terminal in a localized wireless gateway system;
   transmitting registration data identifying the gateway system from the localized wireless gateway system to a home location register database through a public packet data communication network;
   receiving a request from a calling computer coupled to the public packet data communication network for a call to the wireless telephone terminal;
   in response to the request, accessing the home location register database and obtaining a packet data address for the localized wireless gateway system;
   using the address to set up a voice communication through the public packet data communication network and the localized wireless gateway system between the calling computer and the wireless telephone terminal.

2. A method as in claim 1, wherein the calling computer is a terminal computer having voice communication capabilities.

3. A method as in claim 1, wherein the calling computer is a packet service gateway computer, coupled between the public packet data communication network and a public switched telephone network, for providing two-way voice communications to and from at least one telephone via the public packet data communication network.

4. A method as in claim 1, wherein the registering step comprises registering the wireless telephone terminal with an access manager which controls communications through the localized wireless gateway system.

5. A method as in claim 4, wherein the transmitting step comprises transmitting the registration data from the access manager through the public packet data communication network to the home location register database.

6. A method as in claim 1, wherein the public packet data communication network is a packet switched network.

7. A method as in claim 6, wherein the packet switched network comprises a system of interlinked data networks using TCP/IP protocol.

8. A method as in claim 7, wherein the system of interlinked data networks comprises the Internet.

9. A method comprising:
   transmitting a registration message from a wireless telephone terminal through a wireless gateway system to an access manager controlling wireless communication through the wireless gateway system;
   in response to the registration message, transmitting a verification request identifying the wireless telephone terminal and the wireless gateway system through a public packet data network to a home location register database;
   if the wireless telephone is authorized service, transmitting a service verification response message through the public packet data network to the access manager; and
   authorizing a service to the wireless telephone terminal through the wireless gateway system in response to the verification response message, wherein the authorized service comprises making telephone calls at least in part via the public packet data network.

10. A method comprising:
    transmitting a registration message from a wireless telephone terminal through a wireless gateway system to an access manager controlling wireless communication through the wireless gateway system;

in response to the registration message, transmitting a verification request identifying the wireless telephone terminal and the wireless gateway system through a public packet data network to a home location register database;

if the wireless telephone is authorized service, transmitting a service verification response message through the public packet data network to the access manager; and authorizing a service to the wireless telephone terminal through the wireless gateway system in response to the verification response message, wherein the authorized service comprises receiving telephone calls at least in part via the public packet data network.

11. A method as in claim 10, further comprising:

storing identification of the wireless gateway system in the home location register database; and using said identification to route telephone calls through the public packet data network and the wireless gateway system to the wireless telephone terminal.

12. A method as in claim 9, wherein the public packet data communication network is a packet switched network.

13. A method as in claim 12, wherein the packet switched network comprises a system of interlinked data networks using TCP/IP protocol.

14. A method as in claim 13, wherein the system of interlinked data networks comprises the Internet.

* * * * *